(12) United States Patent
Bond

(10) Patent No.: US 7,471,499 B2
(45) Date of Patent: Dec. 30, 2008

(54) WOUND CAPACITOR PROVIDING A THERMAL ALERT OF A HOT SPOT

(75) Inventor: Joseph A. Bond, Eatontown, NJ (US)

(73) Assignee: Electronic Concepts, Inc, Eatontown, NJ (US)

( * ) Notice: Subject to any disclaimer, the term of this patent is extended or adjusted under 35 U.S.C. 154(b) by 0 days.

(21) Appl. No.: 11/717,331

(22) Filed: Mar. 13, 2007

(65) Prior Publication Data
US 2008/0002311 A1    Jan. 3, 2008

Related U.S. Application Data

(60) Provisional application No. 60/817,948, filed on Jun. 30, 2006.

(51) Int. Cl.
*H01G 2/14* (2006.01)
(52) U.S. Cl. .................... 361/274.1; 361/272
(58) Field of Classification Search ............. 361/272, 361/273, 274.1, 274.2, 274.3
See application file for complete search history.

(56) References Cited

U.S. PATENT DOCUMENTS

| | | | |
|---|---|---|---|
| 4,378,620 A | 4/1983 | Lavene |
| 4,422,127 A | 12/1983 | Lavene |
| 4,455,591 A | 6/1984 | Lavene |
| 4,470,097 A | 9/1984 | Lavene |
| 4,516,187 A | 5/1985 | Lavene |
| 4,538,205 A | 8/1985 | Lavene |
| 4,547,832 A | 10/1985 | Lavene |
| 4,603,373 A | 7/1986 | Lavene |
| 4,614,995 A | 9/1986 | Lavene |
| 4,685,026 A | 8/1987 | Lavene |
| 4,719,539 A | 1/1988 | Lavene |
| 4,980,798 A | 12/1990 | Lavene |
| 5,032,950 A | 7/1991 | Lavene |
| 5,371,650 A | 12/1994 | Lavene |
| 5,493,472 A | 2/1996 | Lavene |
| 5,608,600 A | 3/1997 | Lavene |
| 5,610,796 A | 3/1997 | Lavene |
| 5,614,111 A | 3/1997 | Lavene |
| 6,111,743 A | 8/2000 | Lavene |
| 6,819,545 B1 | 11/2004 | Lobo et al. |
| 2004/0232465 A1* | 11/2004 | Shiota et al. ............... 257/298 |
| 2004/0250393 A1* | 12/2004 | Mandelcorn et al. ....... 29/25.42 |

FOREIGN PATENT DOCUMENTS

| | | |
|---|---|---|
| EP | 0 168 370 A1 | 1/1986 |
| GB | 2 021 318 A | 11/1979 |

(Continued)

OTHER PUBLICATIONS

European Search Report, Appln. No. 07110732.0—2214 dated Oct. 24, 2007.

*Primary Examiner*—Eric Thomas
(74) *Attorney, Agent, or Firm*—RatnerPrestia

(57) ABSTRACT

A capacitor having a large current carrying capacity includes a hollow core formed by a non-conducting tubular section, and a capacitor winding wrapped around the tubular section. A sensor is disposed within the hollow core. The sensor is configured to sense a predetermined temperature level within the hollow core and provide an alert external to the capacitor winding.

14 Claims, 7 Drawing Sheets

FOREIGN PATENT DOCUMENTS

| | | |
|---|---|---|
| JP | 06-275455 | 9/1994 |
| JP | 10-027724 A | 1/1998 |
| JP | 2003-264116 A | 9/2003 |
| KR | 2003-0039244 | 5/2003 |
| UA | 67 922 A | 7/2004 |

\* cited by examiner

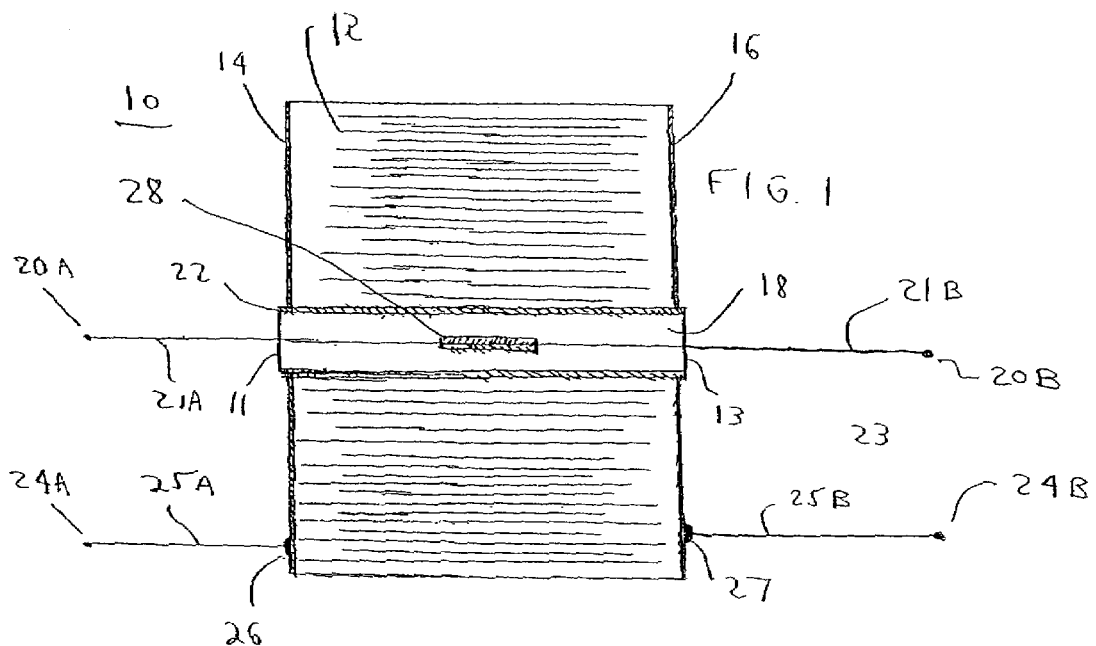
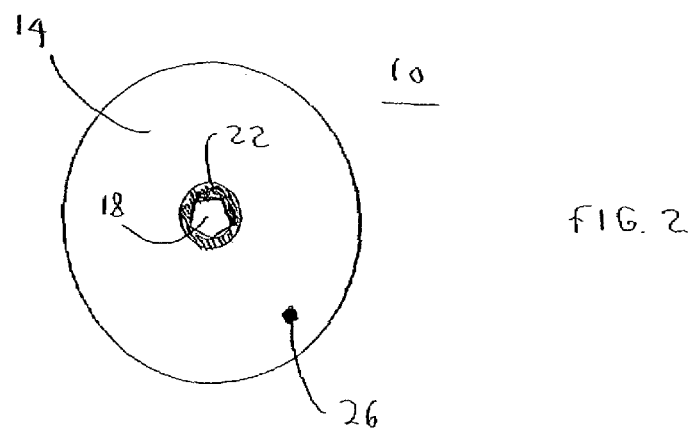

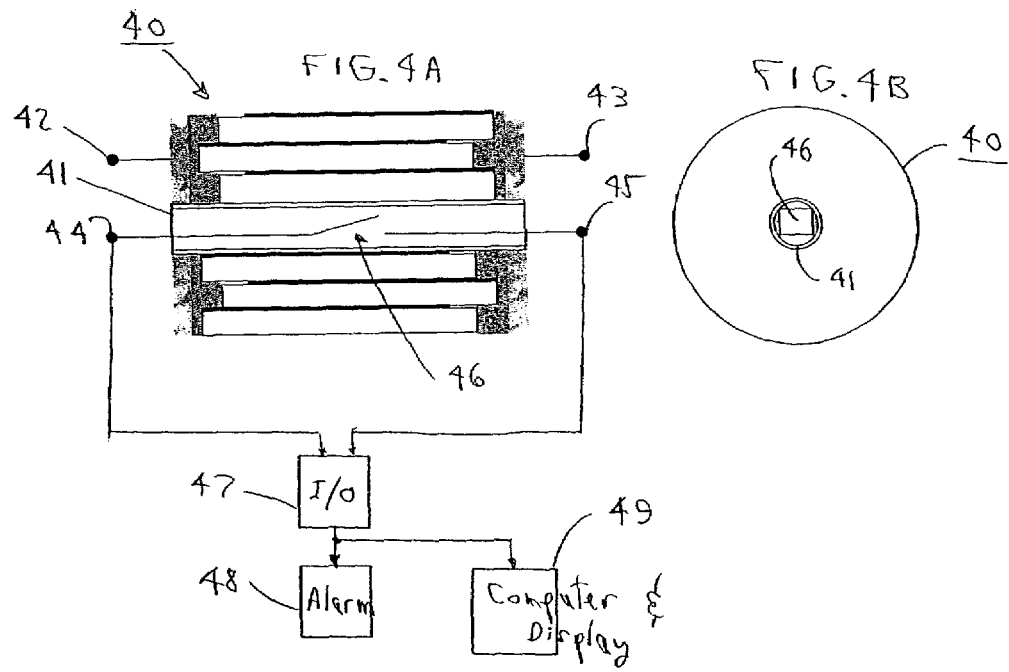
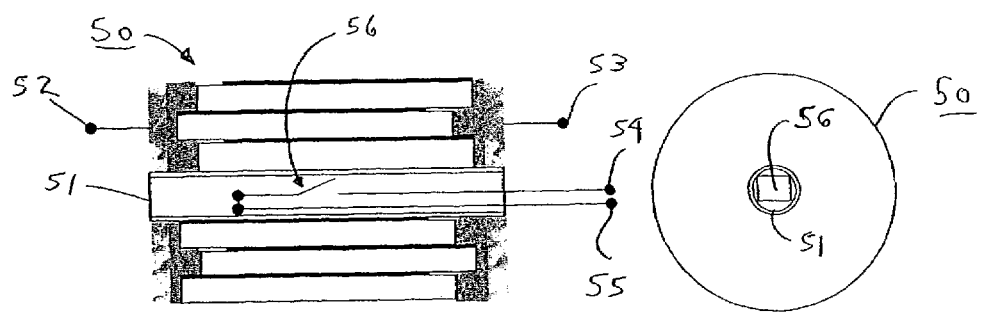

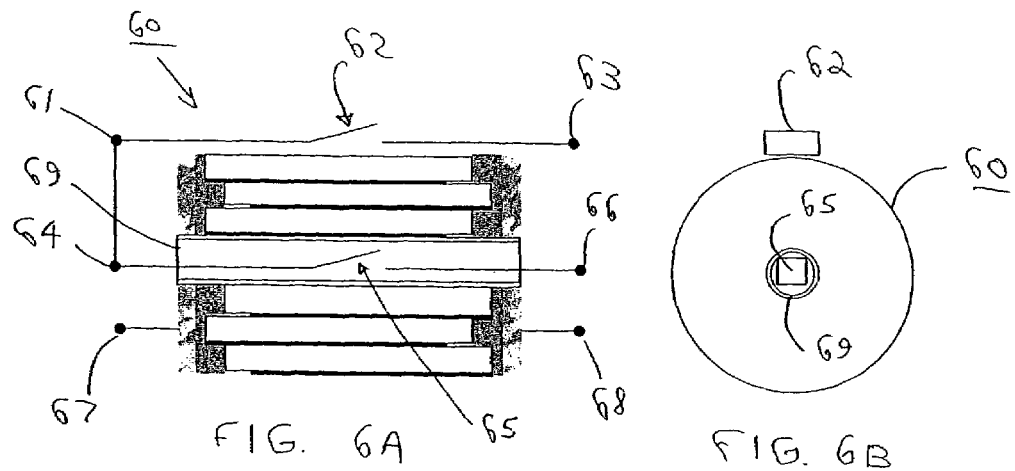
FIG. 6A
FIG. 6B
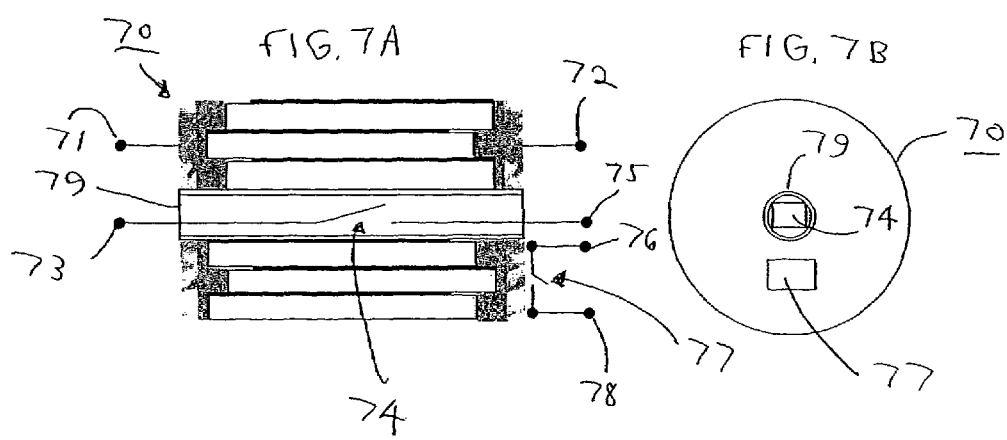
FIG. 7A
FIG. 7B

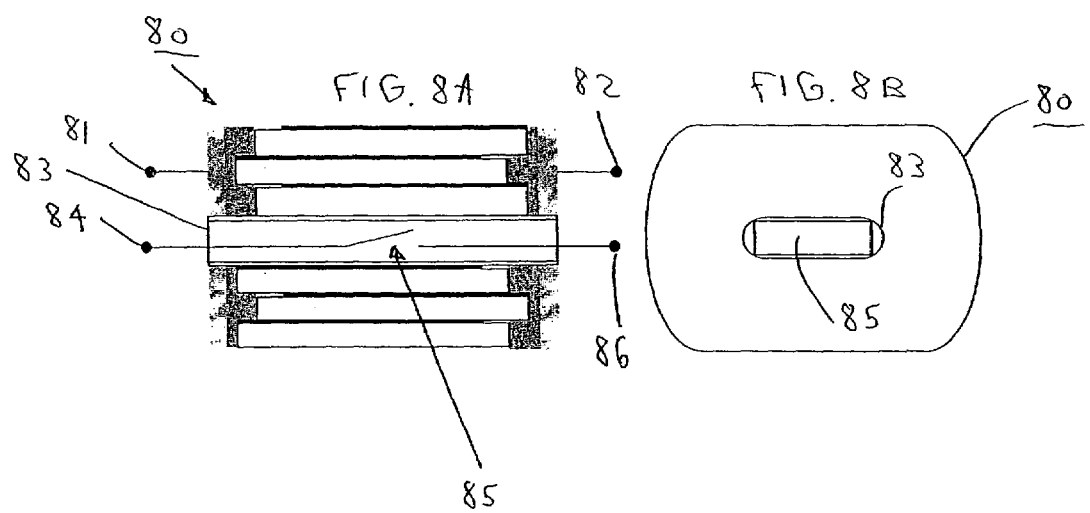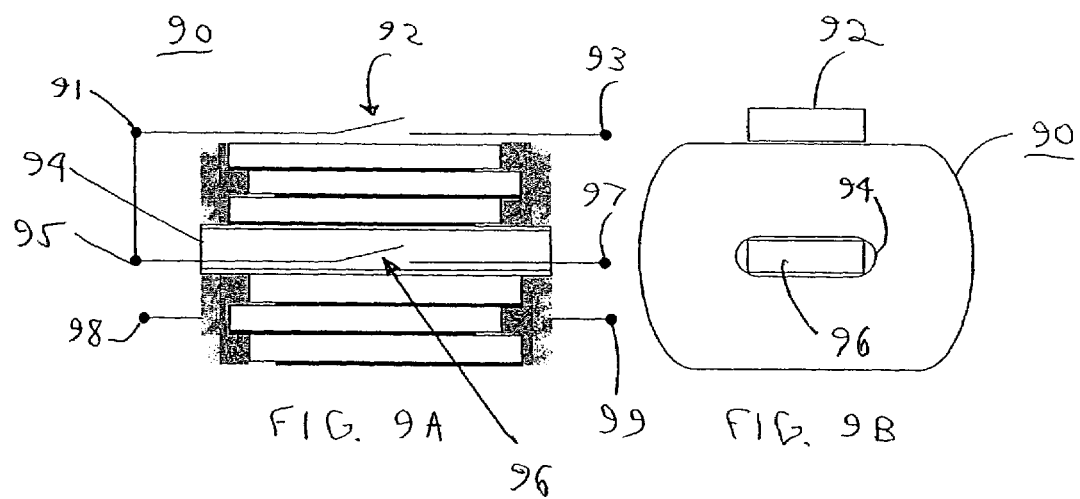

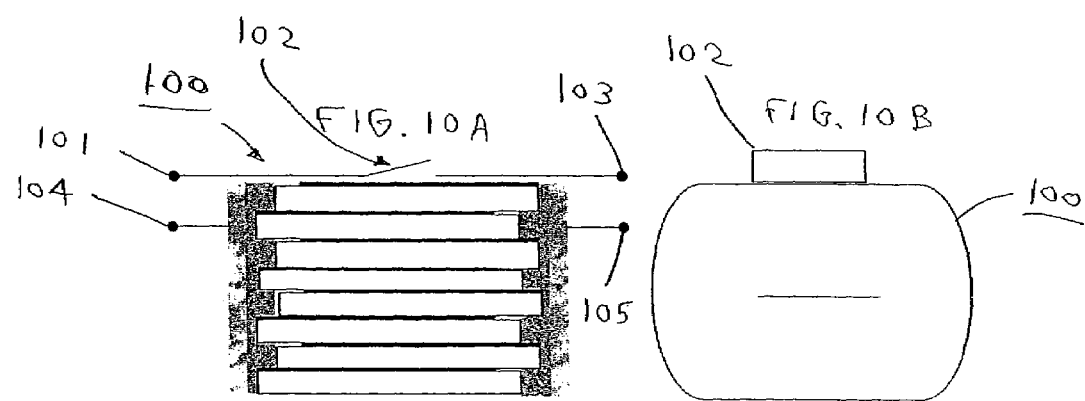
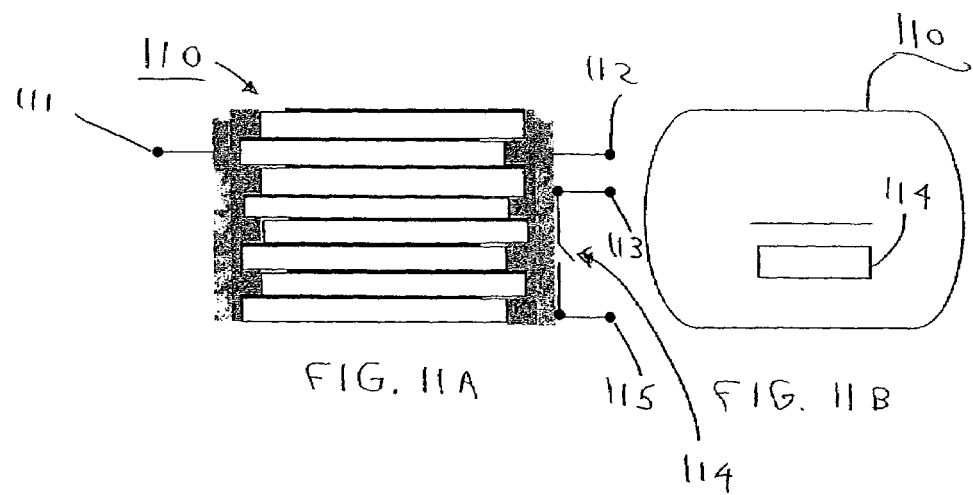

WOUND CAPACITOR PROVIDING A THERMAL ALERT OF A HOT SPOT

CROSS REFERENCE TO RELATED APPLICATIONS

This application claims priority to U.S. Provisional Patent Application Ser. No. 60/817,948, filed Jun. 30, 2006.

TECHNICAL FIELD

The present invention relates, in general, to a wound metallized film, or film-foil capacitor. More specifically, the present invention relates to a wound film capacitor providing a thermal alert, or warning of a hot spot, in or around the capacitor.

BACKGROUND OF THE INVENTION

Industry standards for AC and high power DC capacitors have traditionally centered around oil filled capacitor technology. This technology offers benefits of high corona resistance and transient capabilities. Capacitors using this type of technology, however, have problems of potential oil rupture, expensive housings and terminals, poor high frequency response (noisy), mounting restrictions and increased weight. Oil fill technology traditionally employs series disconnects which remove the capacitor from the circuit (or system) by physical distortion of the capacitor housing to break the conductor. These capacitors are permanently disconnected from the circuit and cannot be reset.

Dry film technology offers advantages over oil fill technology. These advantages include broad frequency range, low power loss, light weight, and self healing devices without liquid rupture potential or mounting restrictions. Dry film capacitors, however, have a failure mode that is typically not found in oil fill capacitors. This failure mode is caused by the quality of the capacitor and its electrode configuration which does not allow the capacitor to go to a low resistance short. Instead, the capacitor continually self heals, as the operating temperature inside the capacitor is increased above its operational limits. As the healing continues, the capacitor continues to function and becomes hotter. This, in turn, causes further healing and leads to an avalanching affect. Eventually the capacitor goes to a high resistance short of several ohms, which acts similarly to a heater inside the capacitor and leads to thermal runaway and to gas release due to decomposition of its polymer material and electrode. The onset of these conditions may arise from misapplication of the capacitor, end of life of the capacitor, or premature failure of the capacitor. Failures under these conditions are usually catastrophic and result in hundreds of thousands of dollars in damage to a system and extended off-line periods for repair.

A standard capacitor using dry film technology is the wound capacitor. Wound capacitors are constructed by sandwiching a dielectric film such as polycarbonate, polypropylene or polyester film, between metal electrodes (e.g., vapor deposited metal film). Once formed, the combination dielectric/metal material is wound to form a capacitor. Some specific examples of wound capacitors are found in the following: U.S. Pat. No. 4,719,539 (Lavene), U.S. Pat. No. 4,685,026 (Lavene), and U.S. Pat. No. 5,614,111 (Lavene). Each of these U.S. patents are incorporated herein by reference.

The size of a capacitor is related to its breakdown voltage. The size of a metallized film capacitor is dictated by the thickness of its dielectric film. The thickness of the dielectric, in turn, is dictated by the required overall breakdown voltage of the capacitor. For instance, if a manufacturer cites a particular film as having a dielectric strength of 200 volts/micron and the capacitor design calls for a dielectric breakdown voltage of 400 volts, then the film may be 2 microns thick. Thus, the breakdown voltage of a capacitor depends on the dielectric strength and the thickness of the film.

When electrical current is passed through a wound film capacitor, thermal energy is generated raising the temperature of the capacitor. In large current applications (for example 7 amperes to 30 amperes), this thermal energy can be quite large and may lead to the deterioration of the capacitor. In some applications the thermal energy may even lead to an explosion.

Additionally, thermal energy may be increased if the capacitor is hermetically sealed, because the hermetic sealing may make it more difficult for the heat to be transferred to the exterior of the capacitor and be dissipated. It is known to place metal cover seals at the opposite ends of hermetically sealed capacitors, thereby increasing somewhat the transfer of thermal energy to the exterior of the capacitor. It is also known to provide perforations in these cover seals. The perforations permit outgassing to occur, when the capacitor is baked prior to sealing, thereby cleaning and drying the capacitor.

It is known to provide fault interrupters to prevent capacitors from overheating or exploding. U.S. Pat. No. 3,496,432 discloses a wound capacitor which forms gas when being overheated. The dielectric of the capacitor winding includes a foil of thermoplastic material with the property of contracting when heated. Thus, when the capacitor winding, upon heating, contracts in the axial direction, one of the metal layers is separated from the capacitor winding, so that electrical connection to the capacitor winding is interrupted.

U.S. Pat. No. 4,639,827 discloses a pressure sensitive fault interrupter for a film capacitor. The film capacitor has a dome-shaped diaphragm. When a fault occurs, pressure is developed within the capacitor as a result of the breakdown of the dielectric, thereby producing various gases. These gases fill the core of the capacitor and exert downward pressure on the diaphragm. The downward pressure changes the concave shape of the diaphragm into a convex shape, thereby breaking the electrical contact between the film capacitor and one of its tabs.

In the prior art, a capacitor may have a fault interrupter that permanently disables the capacitor. This protects the system that houses the capacitor. However, the capacitor cannot be reset and cannot be re-used, after the temperature of the capacitor reaches an acceptable level. The present invention, as described below, includes a sensor that senses a predetermined temperature level of the capacitor and provides an external alert to a user. The user may decide whether to continue operation of the capacitor in the system or shut down the system. The sensor is re-settable and the capacitor may be re-used in the system.

SUMMARY OF THE INVENTION

To meet this and other needs, and in view of its purposes, the present invention provides a capacitor having a large current carrying capacity including a hollow core formed by a non-conducting tubular section, a capacitor winding wrapped around the tubular section, and a first sensor disposed within the hollow core. The first sensor is configured to sense a predetermined temperature level within the hollow core and provide an alert external to the capacitor winding. The first sensor is coupled to an external alert module for triggering an alert to a user upon sensing the predetermined temperature level. The first sensor includes sensor leads and the capacitor includes capacitor leads, and the sensor leads and the capacitor leads are connected independently of each other.

A second sensor may be disposed at an outer surface of the capacitor for sensing another predetermined temperature level at the outer surface and providing an alert to the user upon sensing the other predetermined temperature level. The outer surface is an end spray surface of the capacitor, or an outer radial surface of the capacitor.

The first sensor and the second sensor may be connected in series for providing a single alert to the user upon sensing either the predetermined temperature level within the hollow core or sensing the other predetermined temperature level at the outer surface of the capacitor.

Another aspect of the present invention includes a large current carrying capacitor having a capacitor winding wrapped around an axial line, and a first sensor disposed at an outer surface of the capacitor. The first sensor is configured to sense a predetermined temperature level at the outer surface and provide an alert external to the capacitor winding. The first sensor is coupled to an external alert module for triggering an alert to a user upon sensing the predetermined temperature level. The sensor leads and the capacitor leads may be connected independently of each other.

A second sensor may be disposed at another outer surface of the capacitor for sensing another predetermined temperature level at the other outer surface and providing an alert to the user upon sensing the other predetermined temperature level.

It is understood that the foregoing general description and the following detailed description are exemplary, but are not restrictive, of the invention.

BRIEF DESCRIPTION OF THE DRAWING

The invention is best understood from the following detailed description when read in connection with the accompany drawings. Included in the drawings are the following figures:

FIG. 1 is a cross sectional view of a wound film capacitor including a sensor in accordance with an embodiment of the present invention;

FIG. 2 is a side view of the wound film capacitor shown in FIG. 1, with the sensor having been removed;

FIGS. 4A and 4B show, respectively, a front sectional view and a side sectional view of a wound film capacitor including a sensor for alerting a user when the capacitor reaches a predetermined temperature level, in accordance with an embodiment of the present invention;

FIGS. 5A and 5B show, respectively, a front sectional view and a side sectional view of a wound film capacitor including a sensor for alerting a user when the capacitor reaches a predetermined temperature level, in accordance with another embodiment of the present invention;

FIGS. 6A and 6B show, respectively, a front sectional view and a side sectional view of a wound film capacitor including a sensor for alerting a user when the capacitor reaches a predetermined temperature level, in accordance with yet another embodiment of the present invention;

FIGS. 7A and 7B show, respectively, a front sectional view and a side sectional view of a wound film capacitor including a sensor for alerting a user when the capacitor reaches a predetermined temperature level, in accordance with still another embodiment of the present invention;

FIGS. 8A and 8B show, respectively, a front sectional view and a side sectional view of an oval wound film capacitor including a sensor for alerting a user when the capacitor reaches a predetermined temperature level, in accordance with a further embodiment of the present invention;

FIGS. 9A and 9B show, respectively, a front sectional view and a side sectional view of an oval wound film capacitor including a sensor for alerting a user when the capacitor reaches a predetermined temperature level, in accordance with yet another embodiment of the present invention;

FIGS. 10A and 10B show, respectively, a front sectional view and a side sectional view of an oval wound film capacitor including a sensor for alerting a user when the capacitor reaches a predetermined temperature level, in accordance with still another embodiment of the present invention;

FIGS. 11A and 11B show, respectively, a front sectional view and a side sectional view of an oval wound film capacitor including a sensor for alerting a user when the capacitor reaches a predetermined temperature level, in accordance with another embodiment of the present invention.

DETAILED DESCRIPTION OF THE INVENTION

In a related U.S. Patent application, titled "Wound Capacitor Having a Thermal Disconnect at a Hot Spot", filed by Bernard Lavene, et al., on the same day as the present application (U.S. application Ser. No. 11/717,328), a wound capacitor is disclosed that includes a fuse or a thermal cutoff device. The fuse (or switch, or sensor) is disposed within a hollow core of the wound capacitor, at a geometric center of the capacitor winding. This geometric center is also a hot spot of the capacitor, where the highest thermal energy of the winding is located. The disclosed thermal cutoff device (or sensor) senses the highest temperature level within the capacitor winding.

The thermal cutoff device (or sensor) is connected in series with the capacitor. When the thermal cutoff device reaches a predetermined temperature, conduction of current through the device is automatically interrupted by the opening of a normally-closed switch. In this manner, the capacitor is protected from further heating and a likely fire is automatically prevented in the system housing such capacitor.

In some applications, however, it is not desirable to automatically interrupt the operation of a capacitor upon sensing a predetermined temperature level. In these applications, it is typically preferred to provide a warning or an alert to a user, so that the user may decide whether to continue operation of the capacitor within the system or shut down the system, upon reaching a specified temperature level. The present invention is advantageous for such applications. As will be explained, the present invention includes a capacitor having one or more sensors that may trigger an external circuit upon sensing a predetermined temperature level. The sensor, or sensors, may be reset and the capacitor may be re-used in the system.

Each sensor may trigger a switch upon sensing a predetermined temperature level in the core of the capacitor, on the outer radial surface of the capacitor, or on the end spray portion of the capacitor. Each sensor may trigger the switch at a different temperature. For instance, an outer radial surface sensor may trigger at 70° C., an end spray sensor may trigger at 85° C., and an internal core sensor may trigger at 95° C. This approach allows a capacitor to have one or more sensors, either individually fed out of the capacitor package, or tied together in series to trigger one external circuit, regardless of which capacitor position overheats. This then may lead to system power down in a safe manner, and a technician (or user) may check the system and the capacitor in the system. The sensors may automatically reset upon heat dissipation and the capacitor may be re-energized. The present invention saves very expensive capacitors from destroying a system and prevents catastrophic failures of the capacitors.

Figure 3:
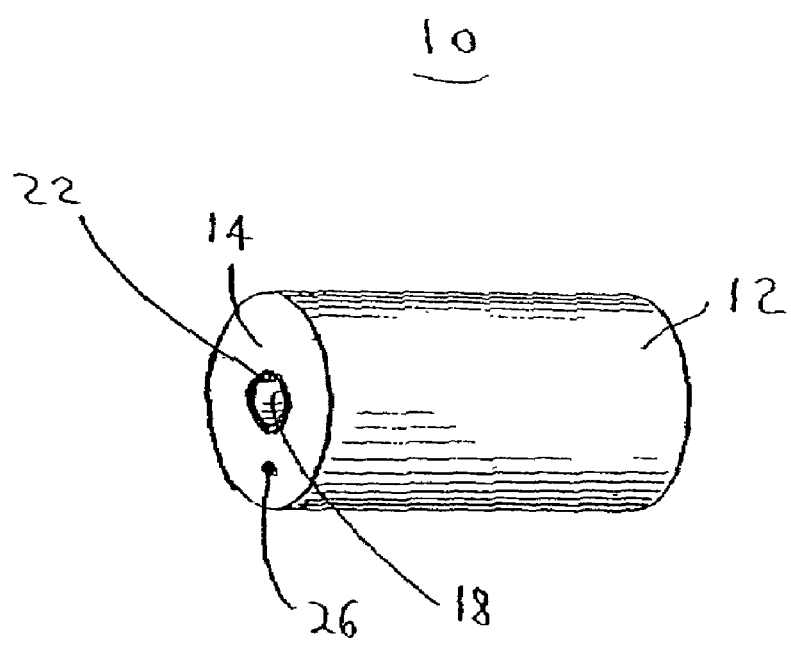
FIG. 3 is a perspective view of the wound film capacitor shown in FIG. 1, with the sensor having been removed.

Referring now to the FIGS. 1, 2 and 3 there is shown a high current carrying capacitor, generally designated as 10. Capacitor 10 includes hollow core 18 surrounded by capacitor winding 12, whereby thermal energy produced within capacitor winding 12, resulting from electrical current passing through winding 12, is transmitted to hollow core 18. As shown, hollow core 18 is formed by non-conducting tubular section 22 which extends slightly beyond the ends of capacitor winding 12 and includes thermal energy from capacitor winding 12. At opposite ends of capacitor winding 12 are two metallization layers 14 and 16.

It will be appreciated that on completion of winding 12 of the capacitor roll, the ends of capacitor winding 12 may be sprayed with a high velocity mixture of compressed air and molten fine particles of tin or other suitable metal produced from an electric arc gun. This spray forms opposing metallization layers 14 and 16, which may be considered electrically the same as opposing first and second terminals of the capacitor. In conventional manner, wire leads 25A and 25B may then each be bonded to respective metallization layers 14 and 16 by way of solder or welded terminals 26 and 27. Metallization layers 14 and 16, positioned at opposite ends of the capacitor roll, completely encircle the outer circumferences of the capacitor roll.

Capacitor winding 12 is wound around tubular section 22 in conventional fashion. Hollow core 18 may be trimmed to extend approximately 0.2 to 0.3 inches beyond metallization layers 14 and 16, thereby forming core extensions or collars 11 and 13. The core extensions, however, are not necessary to the present invention.

As best shown in FIG. 2, tubular section 22 includes an inner hexagonal surface forming the hollow core. This inner surface may be used for anchoring the tubular section to a winding machine. The tubular section is then used as a mandrel for winding the film capacitor into a roll. It will be understood that although FIG. 2 shows a hexagonal cross-section forming the inner surface, any other geometric cross-section may also be used. The cross-section of the inner surface, for example, may be oval, circular, triangular, pentagonal, etc.

For reasons that will be explained, sensor 28 together with wire leads 21A and 21B are inserted into hollow core 18. Sensor 28 includes a switch (not shown) that is in a closed position (also referred to herein as a closed state or a non-resting state) which permits electrical current to flow from wire lead 21A to wire lead 21B.

It will be understood that the wire leads and sensor 28 have been omitted from FIGS. 2 and 3 for purposes of clarity. It will also be understood that wire leads 21A, 21B, 25A and 25B may each include an insulation layer, so that accidental electrical shorts do not occur between the wire leads and metallization layers 14 or 16.

Tubular section 22 may be formed of a non-conductive material, such as polypropylene. Tubular section 22 forms a continuous passageway, referred to herein as hollow core 18, through the entire length of hollow core 18. As an example, the diameter of hollow core 18 may be approximately ⅛ of an inch.

When electric current is passed through capacitor winding 12, thermal energy is generated raising the temperature of capacitor winding 12. As disclosed in related U.S. patent application Ser. No. 11/717,328, (which corresponds to provisional application Ser. No. 60/782,469), the hottest region of capacitor winding 12 is at its geometric center. The geometric center includes the region containing tubular section 22 which is located at the radial center and the axial center of the hollow core. Thus, hollow core 18 passes directly through the region containing the highest temperature within capacitor winding 12. This region is also referred to herein as the hot spot of the capacitor winding.

The hollow core is effective in conducting thermal energy from the capacitor winding to the exterior of capacitor 10. This permits capacitor 10 to carry higher electrical current without deterioration due to excessive heat. It is believed that the geometric center of capacitor 10 does not experience a temperature rise in excess of 20° C. above ambient temperature, because hollow core 18 transfers thermal energy to the exterior of the capacitor.

Capacitor 10 with hollow core 18 may safely handle electrical current an order of magnitude higher than a similar capacitor without a hollow core, if air is circulated through hollow core 18, for example, by a fan (not shown). It is believed that if air is not circulated through hollow core 18, current capacity may still improve by a factor of 5 to 10 over a similar capacitor without hollow core 18.

In order to further protect capacitor 10, sensor 28 is inserted within hollow core 18. Since the geometric center of capacitor 10 is located at the center of gravity of capacitor winding 12, sensor 28 is disposed at the middle of the axial length of hollow core 18. In this manner, sensor 28 is susceptible to the highest temperature, or the hot spot of capacitor winding 12. As shown in FIG. 1, sensor 28 is suspended within hollow core 18, without the need to fasten the sensor to any portion of the tubular section. The sensor is centrally positioned within hollow core 18 with the aid of wire leads 21A and 21B.

Sensor 28 may be similar to other sensors (shown as switches in the exemplary embodiments of FIGS. 4A, 4B, 5A, 5B, 6A, 6B, 7A, 7B, 8A, 8B, 9A, 9B, 10A, 10B, 11A, 11B and 12) and sensors described in provisional application Ser. No. 60/782,469, the contents of which are incorporated herein by reference in their entirety. Sensor 28 may also be an off-the-shelf switch, such as one of different sensors manufactured, for example, by Canadian Thermostats and Control, 8415 Mountain Sights, Montreal, Quebec, Canada.

Referring first to FIGS. 4A and 4B, there is shown one embodiment of the present invention. FIG. 4A depicts a cross sectional view of the capacitor windings around a hollow core. FIG. 4B depicts a side view of the same cylindrical capacitor. As shown, cylindrical capacitor 40 includes hollow core 41. Cylindrical capacitor 40 includes leads 42 and 43. Sensor 46, schematically depicted as a switch, is shown inserted within hollow core 41. Sensor 46 may be housed in a thermally conducting and electrically isolating package, which is shown in a cross sectional view in FIG. 4B.

The leads of sensor 46, designated as 44 and 45, are shown coupled to interface module (I/O) 47 for formatting, as necessary, the trigger output from sensor 46. An alarm module, generally designated as 48, and a computer system including a display, generally designated as 49, are coupled to interface module 47. In operation, sensor 46, which is in a normally closed position, opens its switch arms upon sensing a temperature within core 41 having reached a predetermined threshold. The opening of the switch arms of sensor 46 triggers an alarm to a user by interrupting the current flow in leads 44 and 45. The opening of the switch of sensor 46 may also be used to directly power down all or a portion of the circuit through relay interrupt of all system power or a branch circuit of power.

It will be appreciated that, as shown, interface module 47 includes a voltage supply that is coupled to one lead of sensor 46. Upon the opening of switch 46 (sensor 46), an alarm is sounded to the user and the computer display also alerts the user of the fact that capacitor 40 has reached a predetermined threshold temperature within its hollow core 41. At this time (upon the opening of sensor 46), capacitor winding 40 is still operational within the system (not shown), because leads 42 and 43 are independently connected to other portions of the system. The user having been alerted, may now decide whether to stop operation of the system, or to continue operation of the system.

It will be understood that the connections shown between sensor 46 and the exterior modules of capacitor 40 are one possible configuration in which sensor 46 may alert the user of capacitor 40 having reached the predetermined temperature level. Other configurations for alerting the user, by way of leads 44 and 45 from sensor 46 are, of course, also possible.

Sensor 46 may be re-settable or may become permanently open. If permanently open, sensor 46 may be replaced with another sensor and the operation of capacitor 40 may be resumed within the system.

The embodiment shown in FIGS. 4A and 4B provide a signal trigger from sensor 46 independently of leads 42 and 43 of capacitor 40. This embodiment may be a typical application for sensing the core temperature (geometric center) of a capacitor for applications in DC or AC power, where dissipated wattage in the form of heat is concentrated at the most thermally isolated spot (the core of the capacitor has the longest thermal path out of the package).

Referring next to FIGS. 5A and 5B, there shown another embodiment of the present invention. This embodiment differs from the previously described embodiment in that the leads of the sensor, or switch, are brought out from the core of the capacitor in a radial format, as opposed to an axial format shown in FIG. 4A. As shown in FIG. 5A, capacitor 50 includes hollow core 51 and leads 52 and 53. Sensor 56 is disposed within hollow core 51 with its two leads, designated as 54 and 55, brought out in a radial format. Leads 54 and 55 may be connected in a manner similar to that shown in FIG. 4A for providing an alert to a user.

Referring next to FIGS. 6A and 6B, there is shown yet another embodiment of the present invention. As shown, capacitor 60 includes hollow core 69 and independent leads 67 and 68. Two sensors, designated as 62 and 65, are connected in series by way of leads 61 and 64. Leads 63 and 66 may be connected in a manner similar to that shown in FIG. 4A for providing an alert to a user, that may be either aural or visual in nature, or both. Sensor 65 is used for sensing the temperature rises in hollow core 69. Sensor 62 is used to sense temperature rises along the center of the length of a surface at the outer radius of capacitor winding 60. As an example, sensor 62 may trigger at 70° C. and sensor 65 may trigger at 95° C.

Although leads 63 and 66 are shown being brought out in a radial format, it will be understood that leads 63 and 66 may be brought out in an axial format.

Referring next to FIGS. 7A and 7B, there shown still another embodiment of the present invention. As shown, capacitor 70 includes hollow core 79 and leads 71 and 72. Also shown are two independently connected sensors 74 and 77. Sensor 74 senses the temperature level within hollow core 79. The trigger of sensor 74 is supplied to a user by way of axially connected leads 73 and 75. Sensor 77 is attached to an end spray portion of capacitor winding 70. Leads 76 and 78 of sensor 77 are brought out independently from leads 73 and 75 to a user for providing another alarm and/or another visual display of the capacitor having reached one or more predetermined temperature levels. As an example, sensor 74 may trigger upon reaching a core temperature of 95° C. and sensor 77 may trigger upon reaching a temperature of 85° C.

Referring now to FIGS. 8A and 8B, there shown yet another embodiment of the present invention. As shown, capacitor 80 includes an oval winding and an oval hollow core, designated as 83. Oval formats of a wound capacitor are attractive in applications requiring volume efficiencies. Oval capacitor 80 includes sensor 85 positioned within oval core 83. Leads 81 and 82 are independent connections between capacitor 80 and other portions of a system (not shown). Leads 84 and 86 are axial leads that may be connected for alerts and/or display to a user in a manner that is similar to that shown in FIG. 4A.

FIGS. 9A and 9B depict an oval capacitor, designated as 90, including leads 98 and 99. Oval capacitor 90 includes oval hollow core 94. Two independent sensors are shown positioned in and around capacitor 90. Sensor 96 is positioned within hollow core 94 and sensor 92 is attached to an outer radial surface of capacitor 90. Sensor 92 includes leads 91 and 93, whereas sensor 96 includes leads 95 and 97. Sensor 92 and 96 are connected in series by way of leads 91 and 95. Leads 93 and 97 are supplied to an external alert module and/or an external computer/display module similar to that shown in FIG. 4A. By way of example, sensor 96 may trigger upon reaching a temperature level of 95° C., whereas sensor 92 may trigger upon reaching an outer radius temperature level of 70° C.

FIGS. 10A and 10B depict still another embodiment of the present invention. As shown, oval capacitor 100 includes leads 104 and 105. Capacitor 100 does not have a hollow core. Sensor 102 senses the temperature around the outer radial surface of capacitor 100. Leads 101 and 103 may be supplied to an alert/visual system similar to that shown in FIG. 4A.

FIGS. 11A and 11B show a further embodiment of the present invention. As shown, oval capacitor 110 includes leads 111 and 112. Oval capacitor 110 does not have a hollow core. Sensor 114 is fastened to an end spray surface of capacitor 110. Sensor 114 includes leads 113 and 115 which may be supplied to an external alert/visual module to alert a user.

Figure 12:
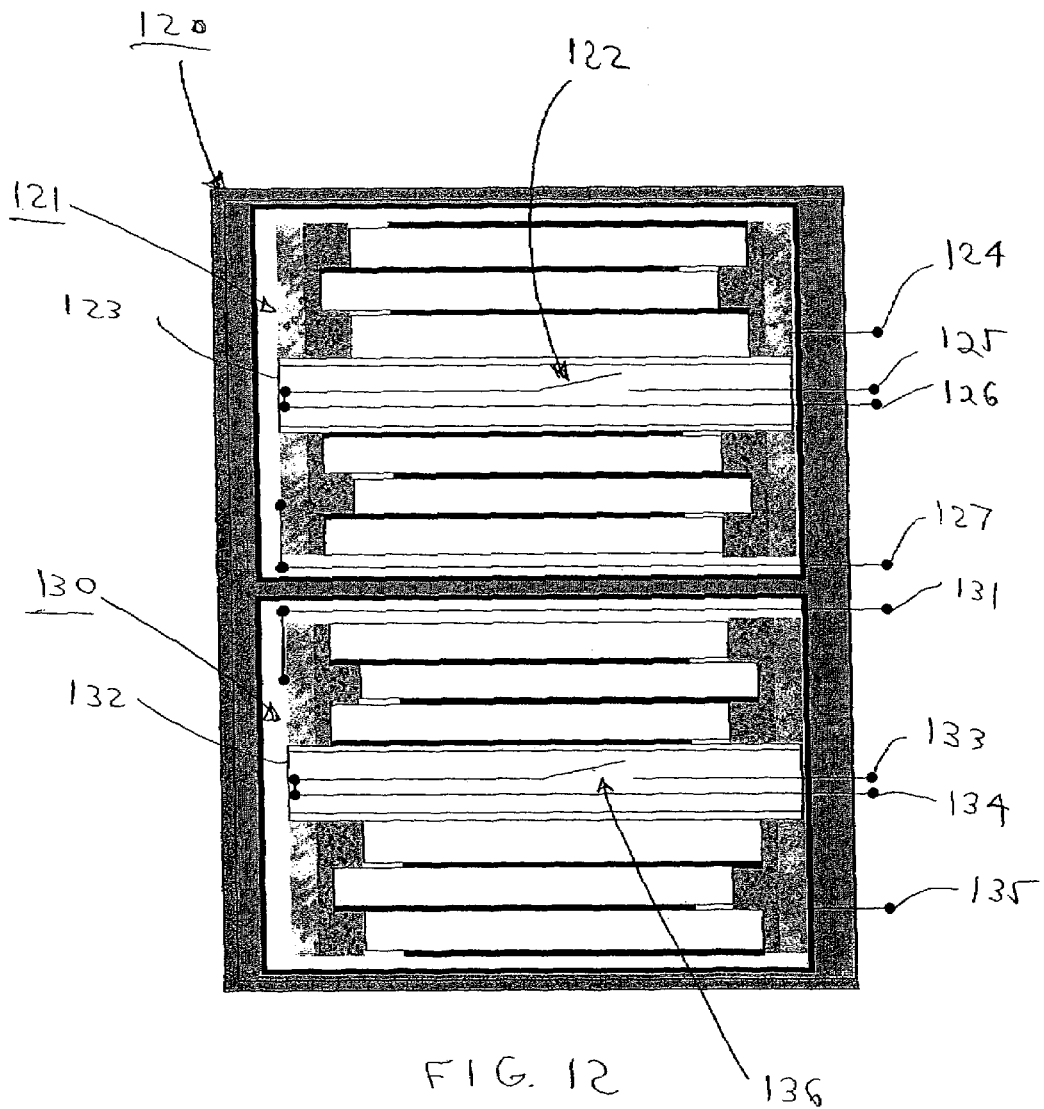
FIG. 12 shows a housing including multiple wound capacitors, each having thermal sensors for individually alerting a user when the capacitors reach predetermined temperature levels, in accordance with still another embodiment of the present invention.

In still another embodiment of the present invention there is shown, in FIG. 12, a multiple winding capacitor housing, designated as 120, that includes wound capacitor 121 and wound capacitor 130. Wound capacitor 120 includes hollow core 123 and wound capacitor 130 includes hollow core 132. The leads of wound capacitor 121 are brought out in a radial format, as shown by leads 124 and 127. Similarly, the leads of wound capacitor 130, designated as 131 and 135, are also supplied in a radial format. Sensor 122 is disposed within hollow core 123 and includes leads supplied to a user for alert by way of radial leads 125 and 126. Similarly, sensor 136 is disposed within hollow core 132 and includes leads for alert to a user by way of radial leads 133 and 134.

It will be appreciated that in each of the shown embodiments, the sensor may be automatically reset upon heat dissipation and the capacitor may then be re-energized.

Although not shown, it will be understood that still other embodiments of the present invention include a sensor that may trigger upon reaching a predetermined temperature level which is connected in series with a wound capacitor (as shown in related U.S. patent application Ser. No. 11/717,328 filed on the same day as the present application, which is incorporated herein by reference in its entirety) and a sensor which is provided in parallel with the same capacitor as described herein by reference to FIGS. 4-12. Thus, the serially connected sensor may automatically interrupt operation of the capacitor, but the parallel connected capacitor may only provide an alert to the user and does not stop operation of the capacitor.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A capacitor having a large current carrying capacity comprising
   a hollow core formed by a non-conducting tubular section,
   a capacitor winding wrapped around the tubular section, and
   a first sensor disposed within the hollow core,
   wherein the first sensor is configured to sense a predetermined temperature level within the hollow core and provide an alert external to the capacitor winding, and
   a second sensor is disposed at an outer surface of the capacitor for sensing another predetermined temperature level at the outer surface and providing an alert to the user upon sensing the other predetermined temperature level.

2. The capacitor of claim 1 wherein
   the first sensor is disposed at a geometric center of the capacitor winding.

3. The capacitor of claim 1 wherein
   the first sensor is coupled to an external alert module for triggering an alert to a user upon sensing the predetermined temperature level.

4. The capacitor of claim 1 wherein
   the first sensor includes sensor leads and the capacitor includes capacitor leads, and
   the sensor leads and the capacitor leads are connected independently of each other.

5. The capacitor of claim 1 wherein
   the outer surface is an end spray surface of the capacitor.

6. The capacitor of claim 1 wherein
   the outer surface is an outer radial surface of the capacitor.

7. The capacitor of claim 1 wherein
   the first sensor and the second sensor are connected in series for providing a single alert to the user upon sensing either the predetermined temperature level within the hollow core or sensing the other predetermined temperature level at the outer surface of the capacitor.

8. A capacitor having a large current carrying capacity comprising
   a capacitor winding wrapped around an axial line, and
   a first sensor disposed at an outer surface of the capacitor,
   wherein the first sensor is configured to sense a predetermined temperature level at the outer surface and provide an alert external to the capacitor winding, and
   the outer surface is an end spray surface of the capacitor.

9. The capacitor of claim 8 wherein
   the first sensor is coupled to an external alert module for triggering an alert to a user upon sensing the predetermined temperature level.

10. The capacitor of claim 8 wherein
    the first sensor includes sensor leads and the capacitor includes capacitor leads, and
    the sensor leads and the capacitor leads are connected independently of each other.

11. The capacitor of claim 8 wherein
    the outer surface is an outer radial surface of the capacitor.

12. The capacitor of claim 8 wherein
    a second sensor is disposed at another outer surface of the capacitor for sensing another predetermined temperature level at the other outer surface and providing an alert to the user upon sensing the other predetermined temperature level.

13. The capacitor of claim 12 wherein
    the first sensor and the second sensor are connected in series for providing a single alert to the user upon sensing either the predetermined temperature level or sensing the other predetermined temperature level.

14. The capacitor of claim 8 including
    a hollow core formed by a non-conducting tubular section, radially disposed about the axial line, and the capacitor winding wrapped around the tubular section, and
    a second sensor disposed within the hollow core,
    wherein the second sensor senses another predetermined temperature level within the hollow core and provides an alert to the user upon sensing the other predetermined temperature level.

* * * * *